US006280592B1

(12) United States Patent
Mastrofrancesco et al.

(10) Patent No.: US 6,280,592 B1
(45) Date of Patent: Aug. 28, 2001

(54) RESIN-BONDED SOLID-FILM-LUBRICANT COATED HOOD LATCH MECHANISM AND METHOD OF MAKING

(75) Inventors: Luigi Mastrofrancesco, Livonia; Jeff LaDuke, Casco; Ronald V. Lebeck, Carleton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/346,664

(22) Filed: Jul. 2, 1999

(51) Int. Cl.[7] ........................ C08F 2/58

(52) U.S. Cl. ........................ 204/485; 204/486; 204/487; 292/DIG. 57; 292/DIG. 64

(58) Field of Search ........................ 204/484–487, 204/510; 29/527.1, 527.2; 292/216, DIG. 57, DIG. 58, DIG. 64

(56) References Cited

U.S. PATENT DOCUMENTS 3,630,557 * 12/1971 Pierce ........................ 292/45
3,787,294 * 1/1974 Kurosaki ........................ 204/16
5,223,104 * 6/1993 Grassi ........................ 204/181.1
5,236,565 * 8/1993 Muller ........................ 204/181.3
5,348,634 * 9/1994 Matsuo ........................ 204/181.1
5,618,069 * 4/1997 Konchan ........................ 292/216
5,624,978 * 4/1997 Soltwedel ........................ 523/402
5,958,847 * 9/1999 Novak ........................ 508/156
6,114,040 * 9/2000 Gebregiorgis ........................ 428/416

* cited by examiner

*Primary Examiner*—Gary W. Estremsky
(74) *Attorney, Agent, or Firm*—Joseph W. Malleck

(57) ABSTRACT

A hood latch mechanism having interengaging pivot elements and pins for pivotally carrying the elements, first and second parts of a frame which are placed on opposite side of the pivot elements, the parts being held together tightly by pins pivotally carrying the pivot elements on the frame parts, springs biasing the pivoting elements to predetermine positions away from the hasp catched position, the pivotal elements and pins having a coating thereon of non-conductive resin and lubricious solid film with the frame and springs having a cathodic electropainted coating thereon, the coatings permitting manual override of the springs to facilitate release of the catched position.

8 Claims, 5 Drawing Sheets

RESIN-BONDED SOLID-FILM-LUBRICANT COATED HOOD LATCH MECHANISM AND METHOD OF MAKING

TECHNICAL FIELD

This invention relates to the technology of coating locking elements to enhance ease of use, and more particularly, to an economical technique for modifying the surfaces of locking elements in an automotive hood latch mechanism to facilitate long-term repeatability of hood pop-up without corrosion interference.

DESCRIPTION OF THE PRIOR ART

Early hood latch mechanisms did not employ springs and automatic, or staged, pop-up of the hood. Such mechanisms consisted of a hasp attached to the underside of the hood which was caught by pivotal catch that could be released by turning or pulling a rod or cable, or by pushing a lever (see U.S. Pat. Nos. 2,832,621, 4,054,309, 4,441,345, and 4,456,289). Little attention was paid to how environmental corrosion or rubbing friction affected the effort needed to release the catch. More recent mechanisms employ pop-up springs that assist in raising the hood when the latch is released. The pop-up feature may be designed to lift the hood only a short distance equivalent to an ajar condition allowing an operator to fully grasp the edge of the hood for movement. In such designs, movements of levers and pawls are calibrated closely to allow for the selection of the smallest spring forces while still allowing for ease of hood pop-up. Interengaging surfaces that pivot or rub together usually experience aggravated corrosion over time and modification of the surfaces to the point that the spring forces become insufficient to provide adequate pop-up. It is desirable to keep the coefficient of friction of the interengaging surfaces as constant throughout the life of the time mechanism; this requires attention to protection from corrosion, as well as to decrease the initial rubbing coefficient between such interengaging surfaces.

Efforts to paint or grease the entire latch mechanism assembly to guard against corrosion have been only successful in part because the readily exposed surfaces have some degree of oxidation protection. However, interengaging bearing surfaces at the axes of the levers or pawls do not get painted because the paint liquid cannot penetrate and reach such hidden surfaces in the assembly or the paint is inhibited from reaching such surfaces due to the Farraday cage effects when electrocoating such assemblies for high volume production. Thus such hidden interengaging surfaces are affected by the migration and penetration of oxygen to corrode such surfaces in service.

SUMMARY OF THE INVENTION

It is an object of this invention to provide an automotive hood latch mechanism that has both enhanced anti-friction pivoting surfaces and anti-corrosion characteristics for the entire assembly so that a manual low force operation can actuate the pop-up mechanism to function properly throughout the life of the latch mechanism.

In a first aspect, the method particularly is a more economical method of making an automotive hood latch mechanism which has a frame and a plurality of interengaging elements, as well as springs for biasing the pivotal elements to certain positions which bias must be overcome to assume a catching position, the method comprising: (a) cleansing the parts in an individual unassembled condition, and phosphating other of said parts than the pivotal elements; (b) coating the pivotal elements with a mixture of non-conductive resin and lubricious solid film material; (c) after removing excess mixture from the coated pivotal elements, curing the resin and lubricious solid film coating in a heated oven; (d) assembling the coated cured pivotal elements with the remainder of the hood latch mechanism; and (e) electrically charging the assembly and subjecting such assembly to a cathodic electrocoating process for applying paint thereto, the electrocoated paint adhering to only the parts which have not been coated with said mixture.

The invention in a second aspect is a hood latching mechanism for catching, in one position, a hasp attached to a hood, the mechanism comprising: (a) interengaging pivotal elements including pins for pivotally carrying the elements, (b) a frame having first and second parts on opposite sides of the pivotal elements, the parts being held tightly together by pins pivotally carrying the pivot elements, (c) springs biasing the pivotal elements to predetermined positions away from the one hasp catching position, and (d) a coating on the pivotal elements including the pins, the coating consisting of non-conductive resin and lubricious solid film, and the frame and springs having a cathodic electrodeposited paint thereon, the coatings facilitating ease of manually overriding the springs to promote controlled release of the catching position throughout the life of the mechanism.

DETAILED DESCRIPTION AND BEST MODE

Figure 1:
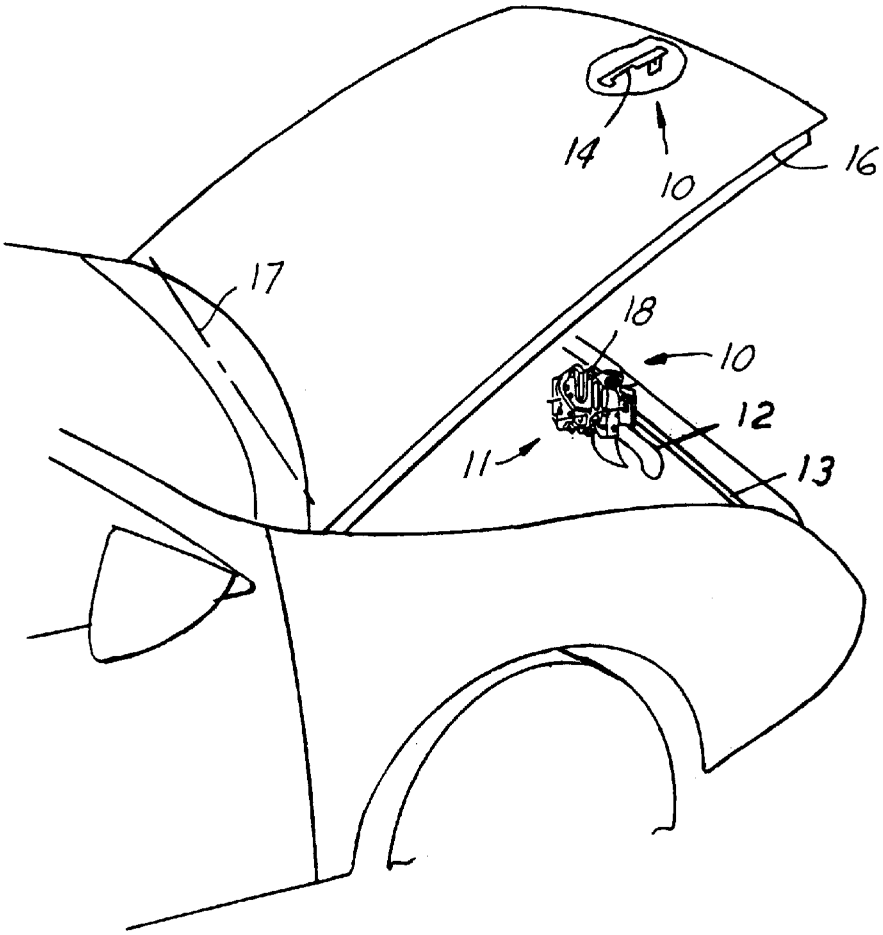
FIG. 1 is a perspective view of a portion of an automotive vehicle front end illustrating the general arrangement of the hood latching mechanism of this invention and the hood hasp that cooperates with such latching mechanism.

As shown in FIG. 1, a hood latch mechanism 10 has a catch assembly 11 bolted to the radiator support bracket 12 carried on the frame 13 of the vehicle body. A hasp 14 is attached by a bracket to the underside of the vehicle hood 16, which hood opens by pivoting movement about axis 17. When the hood is closed, it brings hasp 14 down and into slot 18 of the catch 5 assembly 11. The closure force accompanying manual hood closure is usually in the range of 60–70 lbf and is comprised of the weight of the hood and the manual force of the operator.

Figure 2:
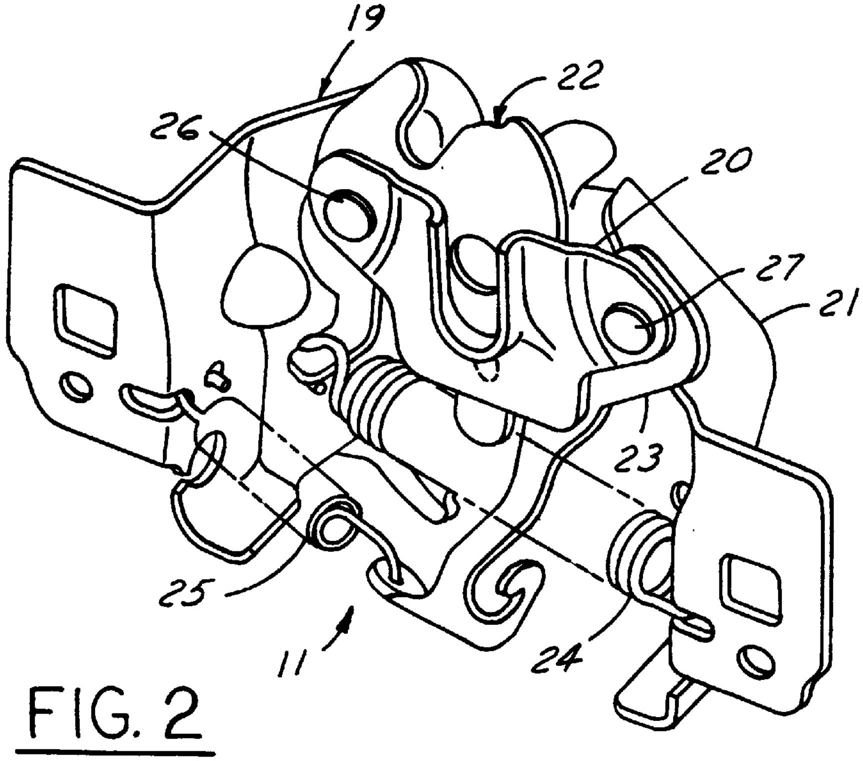
FIG. 2 is an enlarged view of the hood latching mechanism

As shown in FIG. 2, the catch assembly 11 is comprised of a frame 19 having first and second parts 20, 21, which sandwich pivotal elements 22, 23, 26 and 27 therebetween, and two springs 24 and 25 for promoting two operative positions of the mechanism (locked and released) about pivot pins 26, 27. Prior art manufacturing techniques may cause interengaging marginal surfaces of latch mechanisms with raw steel surfaces to experience severe surface degradation and/or corrosion after extended use. Such effects usually occur on the margins or edges of pivotal elements including surfaces of the pivot pins; margins exist also on the oppositely facing portions of the frame parts which touch the pivotal elements including the pins and which are subject to degradation and corrosion.

Figure 3:
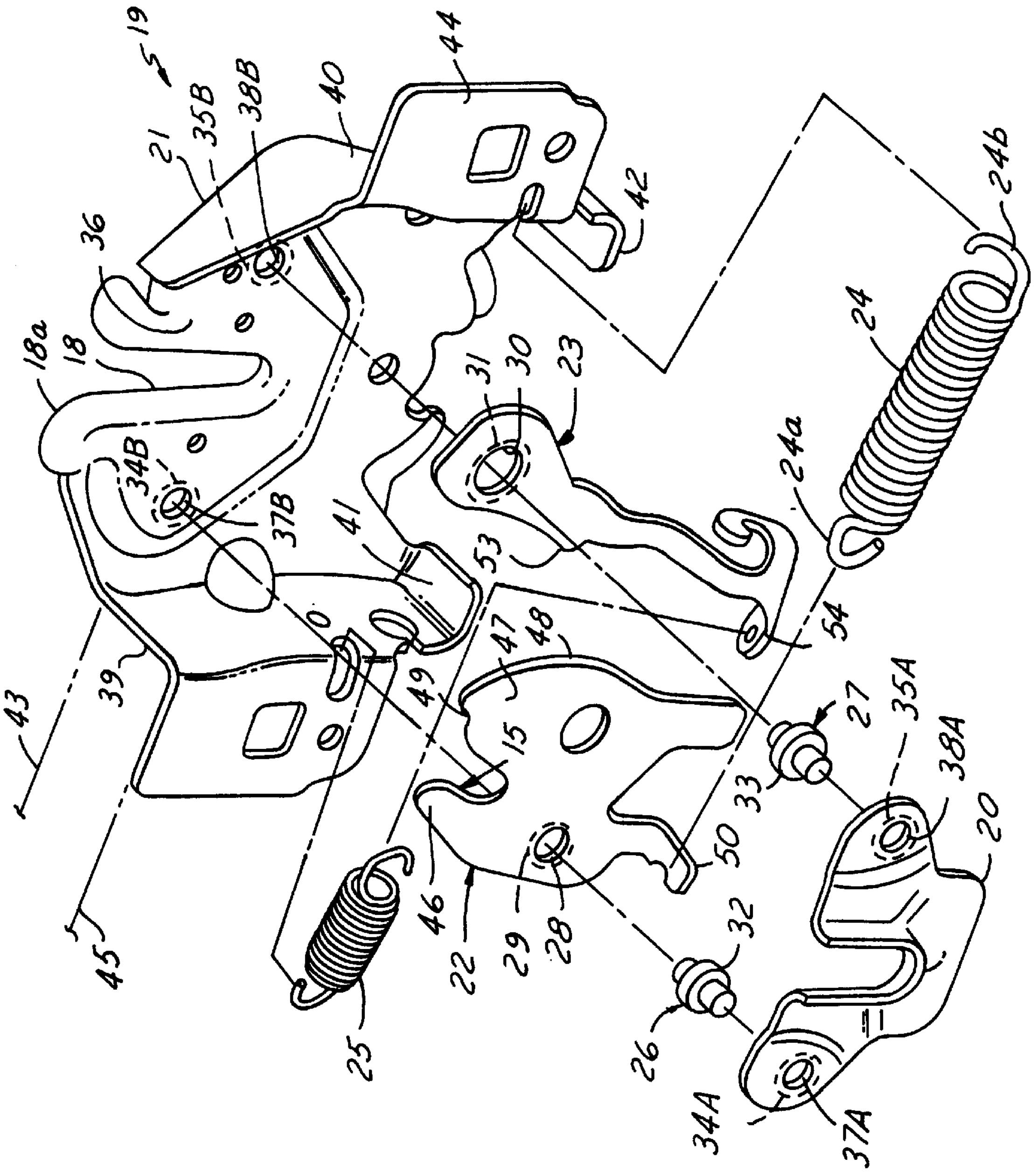
FIG. 3 is an exploded view of the assembly of FIG. 2.
Figure 4:
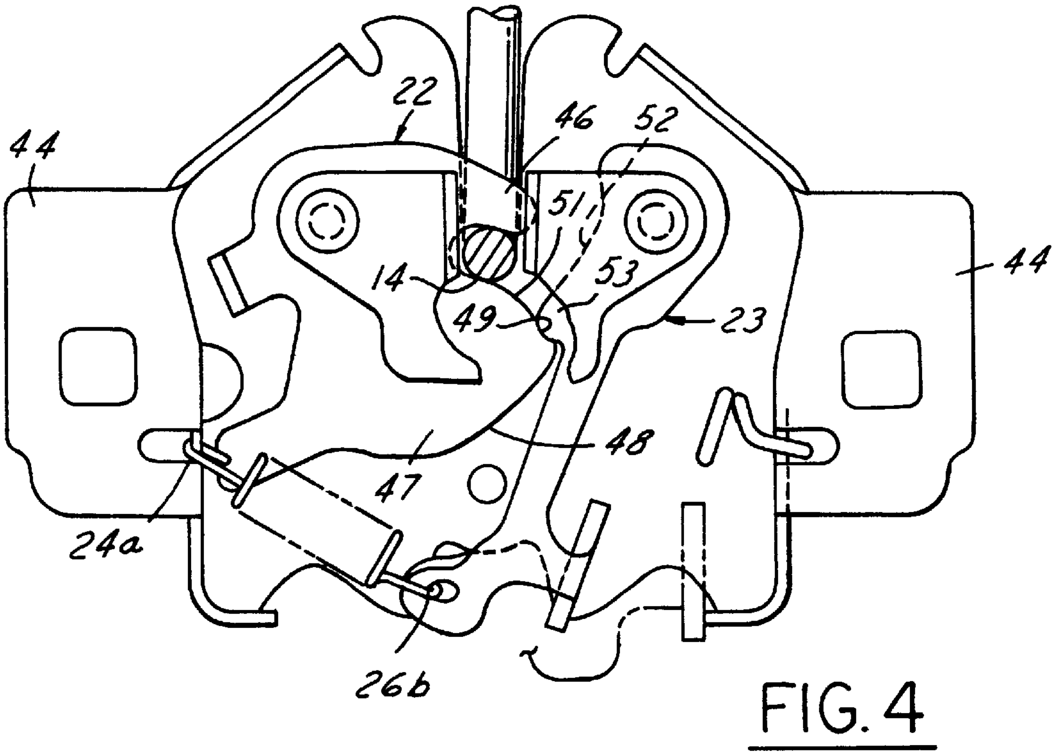
FIGS. 4 and 5 are elevational views of the interengaging pivotal elements shown related to the other parts of the assembly, and shown in respective caught and released positions with respect to the hood hasp.
Figure 5:
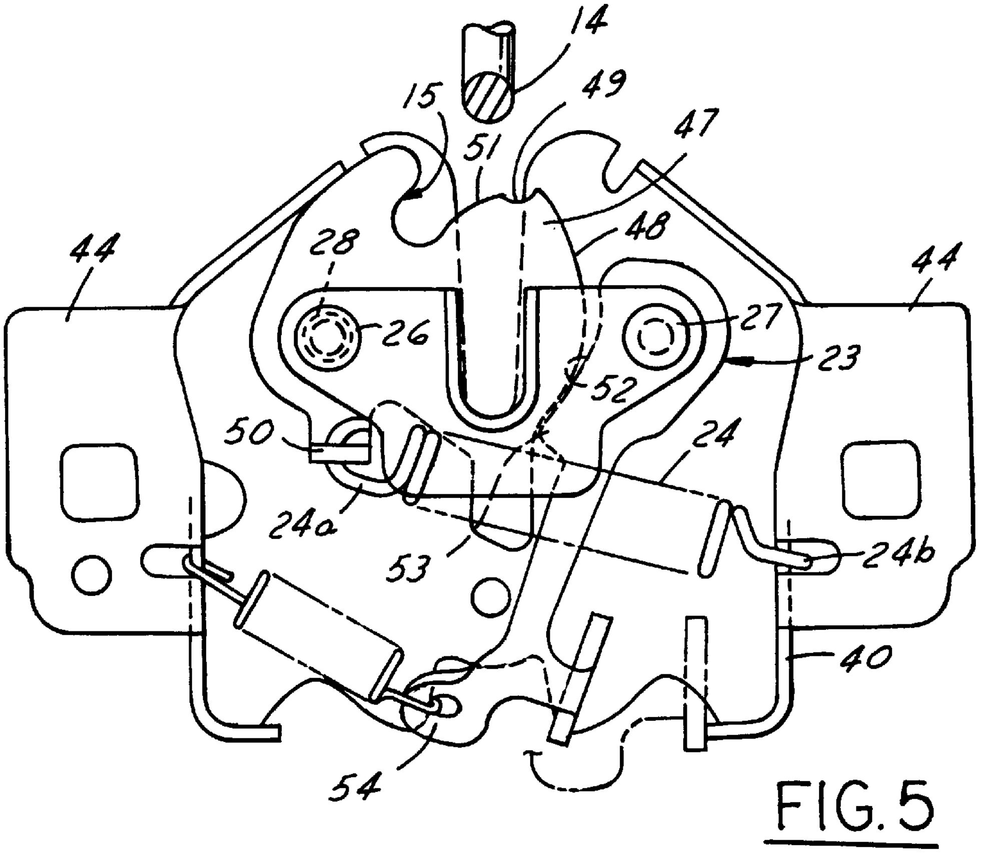

To overcome the problems of prior art techniques, this invention applies differential coating protection to the assembly so that at least such marginal surfaces have a first type of coating and the remainder of the surfaces of the assembly have a second type of coating that is integrated exactly to the first coating for enhanced continuous protection. The role these interengaging margin surfaces (29, 31, 34A, 34B, 35A, 35B, 32, 28, 33, 30) play can be appreciated by reference to FIGS. 3, 4 and 5. Pivotal element 22 is formed as a fork bolt from a flat plate; it has a circular edge 28 defining a pivot pin receiving opening. The edge 28 is mounted on the first pivot pin 26 with a pin clearance typically of about 0.2 mm. Interengaging friction margins 29 are the annular margins on opposite sides of fork bolt 22 about and adjacent the edge 28. Pivotal element 23 is a detent formed also substantially as a flat plate; it has a circular edge 30 defining its own pivot pin receiving opening, which edge 30 is mounted on the second pivot pin 27, also with a similar annular clearance. Margins 31 are the annular margins on opposite sides of the detent 23 which are about and adjacent the edge 30. The annular margins 29 and 31 are in rubbing contact with facing margins 34A, 34B and 35A, 15 35B, of the parts 20 and 21 which also have openings 37 and 38 to receive the pins 26 and 27. Each pivot pin 26. 27 presents respective cylindrical marginal surfaces 32 and 33 on which the respective internal annular edges 28 and 30 internally rubbingly bear.

Attempts to protect the latch mechanism against corrosion have in the past comprised application of a paint coating to the mechanism after it is assembled. Such painting is typically carried by electrolytic attraction (commonly known as electrocoating). The individual parts are not painted, not only because of unnecessarily high manufacturing costs therefrom, but such paint on the interengaging margin surfaces may inhibit proper pivoting movement (drag) and eventually will wear away to expose the original raw steel.

Part 20 of the frame is a metal stamping that has a central web 36 with a central upright slot 18 defined by curving lips 18*a* to guide the hasp 14 thereinto. Openings 37B, 38B on opposite sides of the slot 18 respectively receive the pivot pins 26, 27. Sidewalls 39, 40 extend away from the web 36 on opposite sides and extend perpendicular to plane 43 of the web; each sidewall has a mounting ear 44 extending away from the respective sidewall 39, 40 along a plane 45 parallel to the plane 43 of the web. The sidewalls are strengthened by integral gusset walls 41, 42.

The fork bolt 22 has a slot 15 sized similar to slot 18; the fork bolt is mounted on pivot pin 26 at a location to allow the slot 15 to receive hasp 14 with no obstruction in one position (FIG. 5), and allow the slot to rotate bringing across slot 18 in another position (FIG. 4) of the fork bolt (finger 46 will overlay the hasp 14 and lock it into place). The fork bolt 22 also has an extension 47 carrying an arcuate follower edge 48 terminated by a detent notch 49. The fork bolt is urged to an open or unlocked condition (FIG. 5) by coiled tension spring 24 which has one end 24*a* secured to a transversely extending finger 50 of the fork bolt, and has another end 24b hooked to the sidewall 40. The coiled tension spring 24 normally biases the fork bolt 22 to an open position (FIG. 5) in which the edge 51 defining slot 15 is ready to be engaged by hasp 14. In such open position of the fork bolt, detent 23, mounted for pivoting on pin 27 has a camming edge 52 engaged with the follower edge 48 of the fork bolt; detent nose 53 is spaced away from the fork bolt (see FIGS. 4 and 5) as a result of the detent normally being urged by the small coil tension spring 26, acting between sidewall 39 and a transversely extending finger 54 of the detent.

The weight of the hood 16 and any manual closing force, slams the hasp into slot 18 to engage edge 51 of slot 15 of the fork bolt. Such closing action has sufficient force to overcome the tension of spring 24, as well as the tension of small coil spring 25, to thereby force pivoting of the fork bolt 22 to a position where its finger 46 is moved over the hasp 14 and has follower edge 48 rock against the camming edge 52 of the detent to guide the fork bolt notch 49 into contact with the detent nose 53 to lock the fork bolt in a closed condition in opposition to the coiled springs.

The pop-up condition of the hood may be achieved by simply having a cable or other manual means of moving an extension of the detent to simply overcome the force of the small coiled spring 24, to thereby pivot the detent about the pivot pin 27 in such a manner so that the detent nose 53 is pivoted away from the detent notch 49 of the fork bolt 22, allowing the fork bolt to move under the influence of the larger coiled spring 24 and return to an open position; the force of the larger coil spring thrusts the hasp upwardly through and away from slot 18 (see position of FIG. 5) giving the action a pop-up effect.

Figure 6:
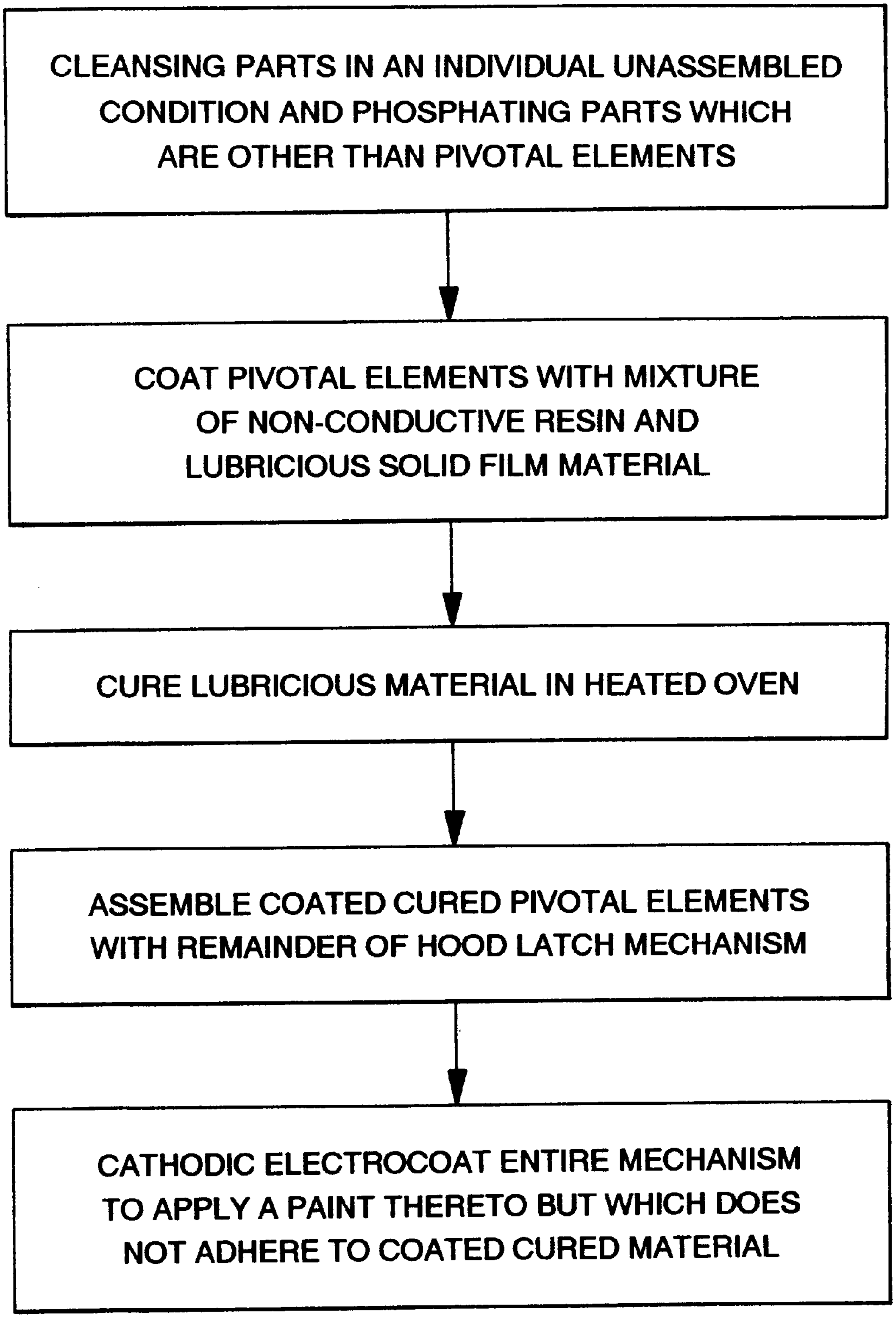
FIG. 6 is a schematic flow diagram of the process steps of the method aspects of this invention.
Figure 7:
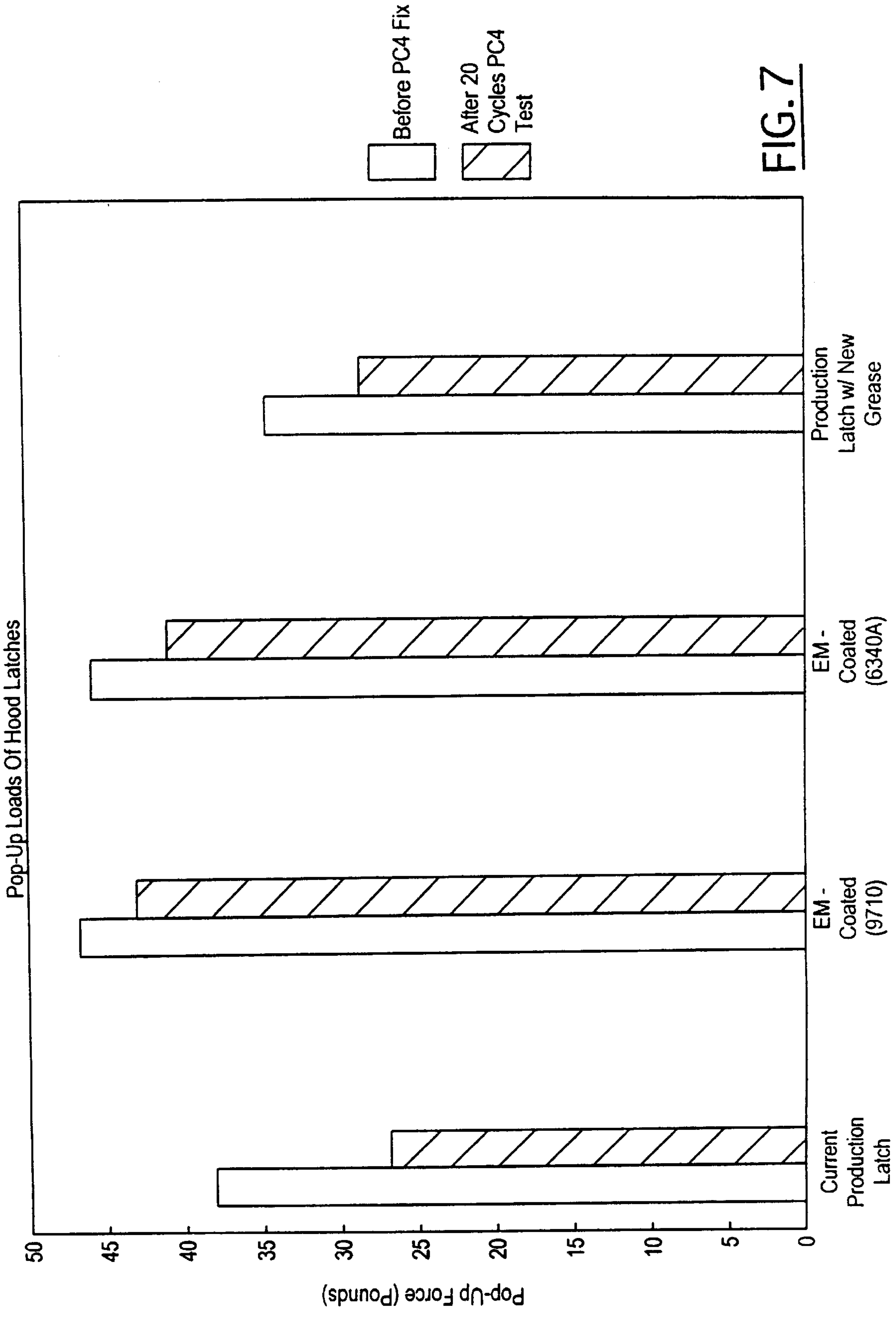
FIG. 7 is a graphical illustration of the pop-up load forces experienced by the hood latch mechanism made in accordance with this invention and those mechanisms made by existing prior techniques.

As shown in FIG. 6, the method aspect of this invention provides for the application of integrated differential coatings that cooperate with each other to overcome the disadvantages of the prior art and do so at substantially the same manufacturing cost level. To this end, pivotal elements carrying any of the interengaging marginal surfaces (such as fork bolt 22, detent 23, pivot pins 26, 27) are placed as individual parts in a foraminous metal basket and dipped sequentially into a degreasing bath and alkaline cleaner bath to present a clean surface for coating. After rinsing and dip drying, such pivotal elements are lowered into a special non-conductive coating bath containing heat curable non-conductive liquid resin and a liquid solid film lubricant in a suitable solvent, such as of the volatile organic type. The resin may be a phenolic type containing molybdenum disulfide as the solid film lubricant; the $MoS_2$ is present in the heat-cured film in an amount of about 30–50% by weight thereof, with the phenolic resin providing essentially 50–70% by weight. A more preferred resin is an epoxy binder that is carried in a water solvent: the epoxy binder is combined with a solid film lubricant in the form of Teflon (PTFE) which is heat curable to a thin film. PTFE advantageously is present in the mixture in a sufficient amount to provide a PTFE content of 25–45% by weight of the heat cured film. The water solvent may desirably consist of 80% by volume dionized water with 20% butyl cellosolve by volume. The viscosity of the bath can be about 35–45 seconds at 77° F. when measured by the number 2 zahn.

Other solid film lubricants may comprise graphite or a combination of Teflon, graphite and $MoS_2$. The solid film lubricant that contributes the best overall combination of corrosion protection and solid film lubrication is PTFE. However, PTFE may become too thick in the installed state sometimes increasing the effort required by the operator to release the pop-up force; this must be properly designed for in advance. Graphite is an excellent solid film lubricant that is better in reducing friction than Teflon, but is porous and does not give the highest corrosion protection. $MoS_2$ is a superior solid film lubricant, but is expensive and lacks corrosion protection. After dipping the pivotal elements, the raised basket is spun at a rotational speed of about 800 rpm to drain and remove excess coating material. After a period of about 5 minutes measured from the time the first parts were coated, the pivotal elements are dumped or placed onto a conveyor for carriage to a curing oven. Curing may be carried out for about 30 minutes at about 400° F. if the epoxy binder is used and for about 30 minutes at 325° F. if the phenolic resin is used. Curing may be repeated to ensure the coated parts are ready to be used in the assembly.

The remaining parts (first and second frame parts and springs) which previously have also been similarly degreased and alkaline cleaned, are given an additional treatment in a phosphating solution to promote a better chemically modified surface for receiving electrocoated paint thereover. Such remaining parts are assembled with the pivotal elements previously cured with a resin lubrication coating thereon. The assembly is carried through an electro-spray paint booth by being hung on cathodically connected frame 66 (the spray paint is charged by an anodically connected nozzle 67). Only those surfaces of the assembly which are conductive will receive or attract particles of charged paint to stick thereon. Thus, the surfaces of the pivotal elements, being non-conductively coated, will not be electrocoated. The electrically coated paint will cover all remaining surfaces of the assembly, right up to the resin/solid lubricant coated surface regions, to provide a continually integrated, but differential, coating across all of the assembly. Thus, the method provides the latch mechanism with an advantageous electrocoat, and additionally provides a lubricious non-corrosive coating on critical interengaging margin surfaces without interfering in any way with the application of the electrocoat.

Such integral dual coatings on the assembly provide several advantages never attained before throughout the life of the latch mechanism, such as reduced coefficient of friction (oubricityi) and corrosion protection. The resulting unique product is an automotive hood latching mechanism that has reduced friction surfaces that decrease the effort and increase the life of operating the mechanism.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of making an automotive hood latch mechanism, the mechanism having parts comprising a frame, a plurality of interengaging pivotal elements to be secured to the frame and springs for biasing the pivot elements to certain positions, such springs when overcome allow the pivotal elements to assume a catching position, the method comprising:

(a) cleansing said parts in an individual unassembled condition and phosphating the parts other than the pivotal elements;

(b) coating said pivotal elements with a mixture of non-conductive resin and lubricious solid film material;

(c) after removing excess mixture from the coated pivotal elements, curing the lubricious material in a heated oven;

(d) assembling the coated cured pivotal elements with the remainder of the hood latch mechanism; and (e) electrically charging said assembly and subjecting it to a cathodic electrocoating process for applying a paint thereto, said electrocoated paint adhering to only said parts which have not been coated with said mixture.

2. The method as in claim 1, in which in step (b), said mixture is proportioned between resin and solid lubricant to provide a solid lubricant in the cured coating of 20–50% by weight.

3. The method as in claim 1, in which the lubricious solid film material of step (b) consists of molybdenum disulfide.

4. The method as in claim 1, in which said lubricious solid film material in step (b) consists of polytetrafluoride ethylene.

5. The method as in claim 1, in which said lubricious solid film material of step (b) consists of graphite.

6. The method as in claim 1, in which step (b) is carried out by dipping said individual pivotal elements in a bath consisting of said mixture, said dipped parts then being subjected to a spin draining to remove excess fluid.

7. The method as in claim 1, in which said pivotal elements comprise at least the interengaging marginal surfaces a detent, fork bolt and cylindrical surfaces of pivot pins.

8. The method as in claim 1, in which the mixture used in step (b) consists of a water soluble epoxy, and the solid film material consists of polytetrafluoride ethylene.

* * * * *